United States Patent [19]

Farrington et al.

[11] Patent Number: 5,325,283
[45] Date of Patent: Jun. 28, 1994

[54] NOVEL ZERO-VOLTAGE-SWITCHING FAMILY OF ISOLATED CONVERTERS

[75] Inventors: Richard W. Farrington; Milan M. Jovanovic; Fred C. Lee, all of Blacksburg, Va.

[73] Assignee: Center for Innovative Technology, Herndon, Va.

[21] Appl. No.: 896,093

[22] Filed: Jun. 8, 1992

[51] Int. Cl.$^5$ .......................................... H02M 3/335
[52] U.S. Cl. ........................................ 363/21; 363/98; 363/132
[58] Field of Search ............... 363/17, 20, 21, 56, 363/98, 97, 132, 131

[56] References Cited

U.S. PATENT DOCUMENTS

| | | | |
|---|---|---|---|
| 4,533,986 | 8/1985 | Jones | 363/17 |
| 4,785,387 | 11/1988 | Lee et al. | 363/21 |
| 4,788,634 | 11/1988 | Schlecht et al. | 363/21 |
| 4,857,822 | 8/1989 | Tabisz et al. | 323/282 |
| 4,864,479 | 9/1989 | Steigerwald et al. | 363/17 |
| 4,953,068 | 8/1990 | Henze | 363/17 |
| 5,027,264 | 6/1991 | Dedoncker et al. | 363/16 |
| 5,126,931 | 6/1992 | Jitaru | 363/21 |
| 5,132,889 | 7/1992 | Hitchock et al. | 363/17 |
| 5,157,592 | 10/1992 | Walters | 363/17 |
| 5,173,846 | 12/1992 | Smith | 363/20 |
| 5,177,675 | 1/1993 | Archer | 363/25 |
| 5,198,969 | 3/1993 | Redl et al. | 363/17 |
| 5,206,800 | 4/1993 | Smith | 363/21 |
| 5,231,563 | 7/1993 | Jitaru | 363/98 |

OTHER PUBLICATIONS

"Recent Developments in High-Frequency Quasi-Resonant and Multi-Resonant Technologies", Third European Conference on Power Electronics and Applications Proceedings, pp. 401–410, 1989; Lee, Tabisz and Jovanovic.

Primary Examiner—Steven L. Stephan
Assistant Examiner—Adolf Berhane
Attorney, Agent, or Firm—Whitham & Marhoefer

[57] ABSTRACT

An isolated zero-voltage-switching converter in which the magnetizing inductance of the isolating transformer is a resonant element and an open circuit is provided on the secondary side of the transformer during the time interval when both primary switches are off. When the secondary of the transformer is open, the magnetizing inductance is in series with the capacitances of the primary switches, thus forming a resonant circuit.

6 Claims, 11 Drawing Sheets

FIG.6A Stage A

FIG.6B Stage B

FIG.6C Stage C

FIG.6D  Stage D

FIG.6E  Stage E

FIG.6F  Stage F

FIG.7G  $I_{prim}$

NOVEL ZERO-VOLTAGE-SWITCHING FAMILY OF ISOLATED CONVERTERS

BACKGROUND OF THE INVENTION

1. Field of the Invention

The present invention relates to zero-voltage-switched, isolated converters, and more particularly to an improved zero-voltage-switched, transformer coupled converter that utilizes the inductance of the transformer as a resonant element to provide zero-voltage-switching.

2. Description of the Prior Art

Circuit parasitics, such as transformer leakage inductance, semiconductor junction capacitances, and rectifier reverse recovery are among the major factors impeding higher switching frequency of "hard switched" pulse-width-modulating (PWM) converters. Recent developments in high-frequency resonant and quasi-resonant converter topologies have shown an increased utilization of parasitic components. Several innovative techniques have been proposed to operate the active switch with zero-voltage turn-on in order to minimize switching losses, stresses, and noise. The zero voltage-switching concept has also been extended to include both active and passive switches. A generalized multi-resonant concept was proposed, enabling implementation of zero-voltage-switching (ZVS) for all semiconductor components. The resulting multi-resonant converters (MRCs) utilize the transformer leakage inductances and transistor and rectifier junction capacitances to form a multi-component resonant network in order to obtain zero-voltage turn-on of all semiconductor components, reducing switching losses.

Zero-voltage-switched quasi-resonant converters (QRCs) and multi-resonant converters (MRCs) require the use of a relatively large resonant inductor to achieve zero-voltage switching over a wide-load range. The resonant inductor is also subjected to high resonant currents and voltages. As a result, the resonant inductor has a significant impact on the overall efficiency and size of the zero-voltage-switching, quasi-resonant-converters and zero-voltage-switching, multi-resonant converters.

Figure 1:
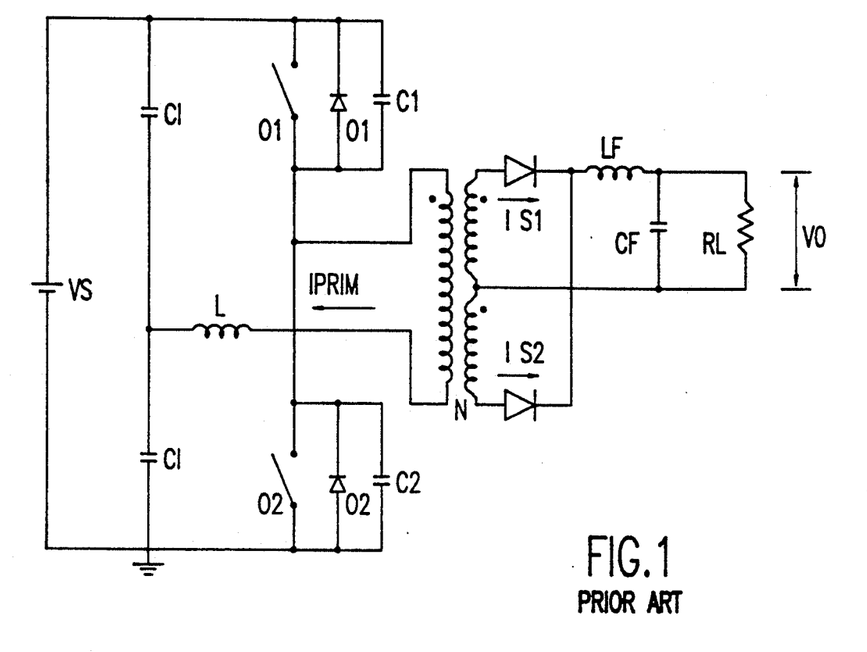
FIG. 1 is a schematic diagram of a prior art half-bridge, zero-voltage-switching, quasi-resonant-converter.

In isolated zero-voltage-switching and quasi-resonant-converters and zero-voltage-switching, multi-resonant converter topologies, the resonant inductor is connected in series with the primary winding of the power transformer as shown in FIG. 1 for a half-bridge (HB) zero-voltage-switching, quasi-resonant-converter. However, the magnetizing inductance cannot be used as a resonant element, because the transformer is shorted during the resonant stage.

SUMMARY OF THE INVENTION

It is therefore an object of the present invention to provide a family of isolated, zero-voltage-switching converters using the magnetizing inductance of the isolating transformer as a resonant element.

Briefly, this invention contemplates the provision of an isolated zero-voltage-switching converter in which an open circuit is provided on the secondary side of the transformer during the time interval when both primary switches are off so that the magnetizing inductance of the isolating transformer is used as a resonant element. When the secondary of the transformer is open, the magnetizing inductance is in series with the capacitances of the primary switches, thus forming a resonant circuit.

BRIEF DESCRIPTION OF THE DRAWINGS

The foregoing and other objects, aspects and advantages will be better understood from the following detailed description of a preferred embodiment of the invention with reference to the drawings, in which:

FIG. 6, Stages A through F, illustrates the respective topological stages of the half-bridge zero-voltage-switching converter in accordance with the teachings of this invention, operating in a multi-resonant mode.

FIG. 7, Stages A through H, are typical waveforms for the half-bridge zero-voltage-switching converter in accordance with the teachings of this invention, operating in a multi-resonant mode.

FIG. 10, Stages A through D, are oscillograms of the experimental half-bridge zero-voltage-switching converter described herein.

DETAILED DESCRIPTION OF A PREFERRED EMBODIMENT OF THE INVENTION

Figure 2:
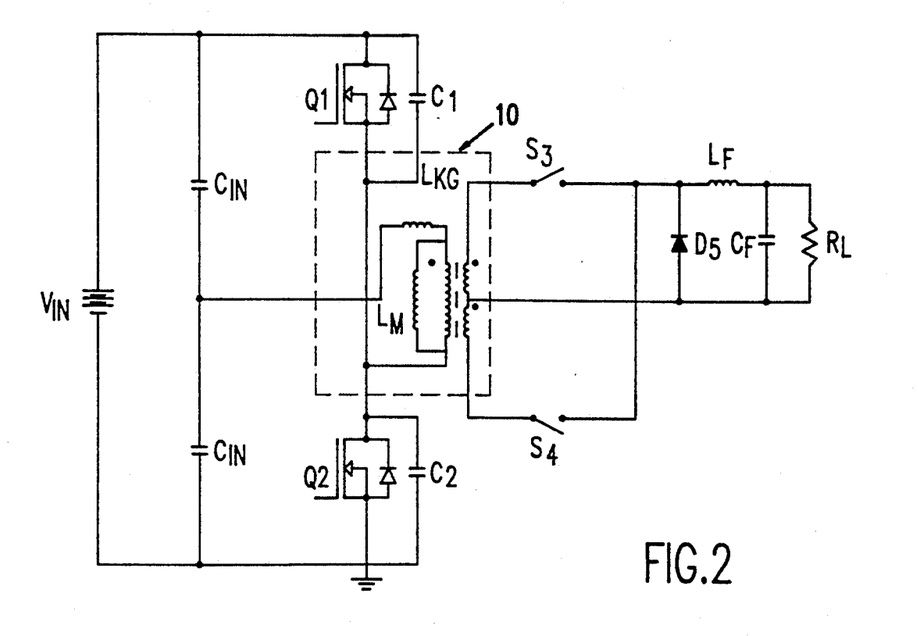
FIG. 2 is a schematic diagram of a half-bridge, zero-voltage-switching, quasi-resonant-converter utilizing the magnetizing inductance of the isolating transformer as a resonant element in accordance with the teachings of this invention.

Referring now to the drawings, and more particularly to FIG. 2, it shows the conceptual implementation of a half-bridge zero-voltage-switching which utilizes the magnetizing inductance $L_M$ of the isolating transformer 10 as a resonant element. In order to open the transformer secondary winding during the resonant stage, the rectifiers D1 and D2 of the converter shown in FIG. 1 are replaced by switches S3 and S4.

The switches S3 and S4 open the secondary winding of the isolating power transformer 10 during the resonant interval at which the switches Q1 and Q2 switch from a conducting to non-conducting state and vice versa. In accordance with the teachings of this invention, the resonant circuit to provide zero-voltage-switching is established in part by the isolating power transformer magnetizing inductance $L_M$.

Figure 3:
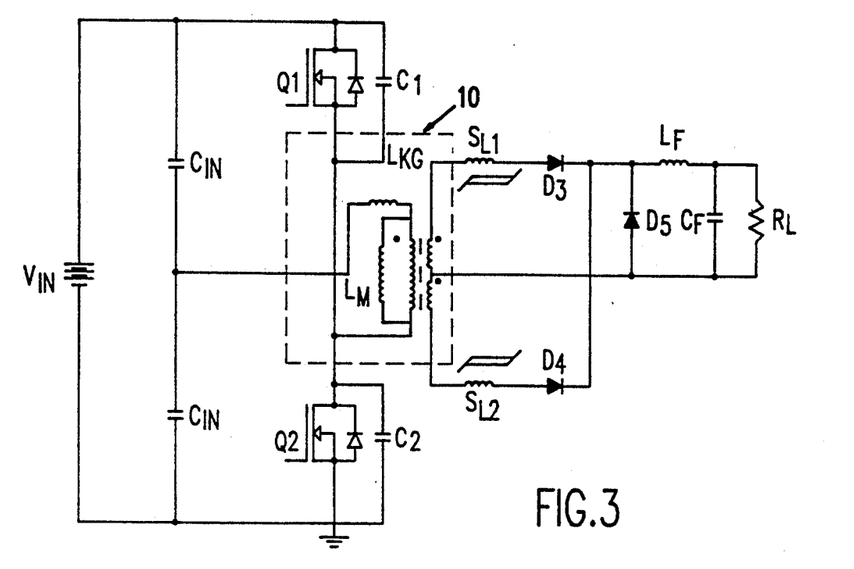
FIG. 3 is a schematic diagram similar to FIG. 2, in which a series combination of saturable reactor and rectifier diodes are used as switching elements to provide an open circuit secondary.

The switches S3 and S4 can be implemented by the series combination of a saturable reactor and a rectifier diode. The saturable reactor and rectifier diode combination as a switch is explained in more detail in article entitled "A new constant frequency phase-shifted PWM zero-voltage switching dc—dc converter incorporating non-controllable saturable reactors" by S. Hamada, et al., IEEE Transactions on Magnetics, Vol. 25, No. 5, pp. 3991– 3993, 1989. The saturable reactor provides the necessary delay to ensure the resonant interval has ended, before allowing the rectifier diode to conduct. FIG. 3 is a schematic diagram similar to FIG. 2, in which a series combination of saturable reactor ($S_{L1}$ and $S_{L2}$) and rectifier diodes ($D_3$ and $D_4$) are used as switching elements to provide an open circuit secondary.

The output rectifiers $D_3$ and $D_4$ of the converters shown in FIG. 3 turn off with an abrupt reverse voltage, resulting in parasitic ringing of the junction capacitance of the rectifiers, and the transformer secondary side leakage inductance ($L_{k6}$) and lead inductances. To avoid ringing, it is necessary to resonate the rectifier voltage in a controlled fashion as, for example, it is done in zero-voltage-switching, multi-resonant converters. See for example, the article by F. C. Lee et al., entitled "Recent developments in high-frequency quasi-resonant and multi-resonant technologies", Third European Conference on Power Electronics and Applications Proceedings, pp. 401–410, 1989.

Figure 4:
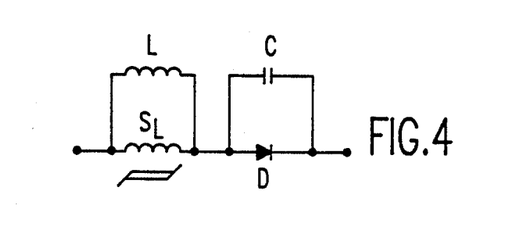
FIG. 4 is a schematic diagram of a soft-switching series combination of saturable reactor and rectifier diode useful in the practice of the invention.
Figure 5:
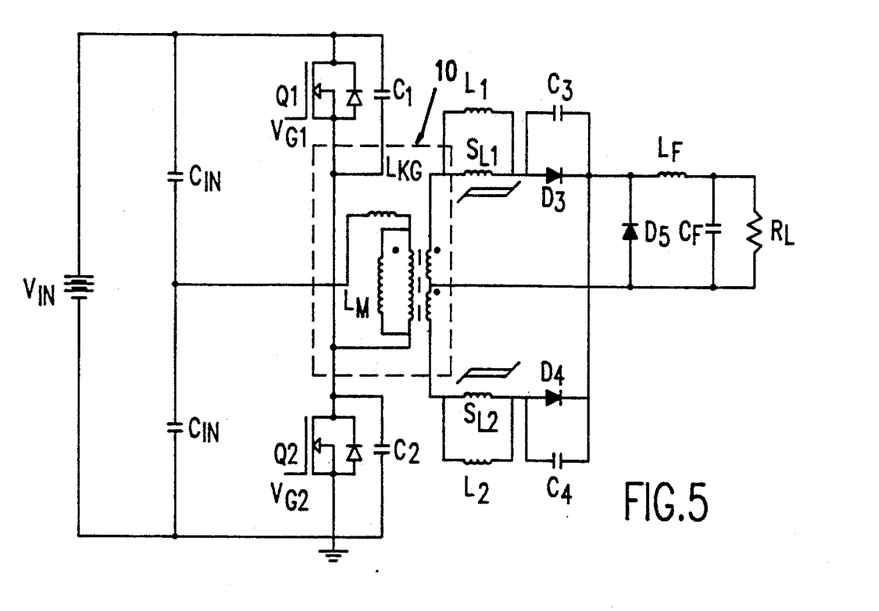
FIG. 5 is a schematic diagram similar to FIG. 3, employing the soft-switching combination of FIG. 4.

The rectifier-voltage resonance can be controlled by adding a linear inductor L in parallel with the saturable inductor $S_L$ as shown in FIG. 4 A half-bridge zero-voltage-switching converter in accordance with the teachings of this invention employing the linear inductor in parallel with the saturable reactor to open the secondary is shown in FIG. 5. The saturable inductor provides the needed delay (open circuit) to allow the magnetizing inductance to be utilized to achieve zero-voltage-switching of the primary side switches, and will carry most of the load current once it saturates. The linear inductor provides a path for the parasitic capacitance of the nonconducting rectifier to charge and discharge in a controlled fashion. The linear inductor can be designed to carry less than 5% of the total load current, making the circulating energy in these converters much smaller compared to conventional MRCs. All semiconductor devices, with the exception of the freewheeling diode when needed, switch under zero voltage.

The operation of the half-bridge, push-pull, and full-bridge topologies result in squared-type currents and voltages stresses due to the small duration of the resonant stage involving the magnetizing inductance of the power transformer. Pulse-width-modulated type waveforms are very desirable since they result in lower conduction losses and lower device ratings. The operation of these three converters is very similar, so only the operation of the half-bridge topology will be discussed.

Still referring to FIG. 5, the resonant components of the zero-voltage-switching half-bridge converter are the capacitances in parallel with each of the active switches, C1 and C2, the capacitances C3 and C4, in parallel with each of the rectifier diodes, the magnetizing inductance of the power transformer $L_M$, and the linear inductors in parallel with each of the saturable inductors, L1 and L2. The following analysis of the converter shown in FIG. 5 is based upon these simplifying assumptions:

a) the output filter inductance is sufficiently large to be approximated by a current source with a value equal to the output current, $I_0$;
b) the voltage drop across the conducting semiconductor switches (MOSFETs and diodes) is negligible;
c) the switching times of the semiconductor switches are zero;
d) C1=C2, C3=C4, L1=L2; and
e) the saturable inductors, SL1 and SL2, are identical.

Finally, the effect of the leakage inductance of the power transformer is neglected.

During one switching cycle, the converter enters a sequence of six different topological stages. The different converter stages are shown in FIG. 6, Stages A through F. FIG. 7 shows the key waveforms of this converter during normal operation.

Figure 6A:
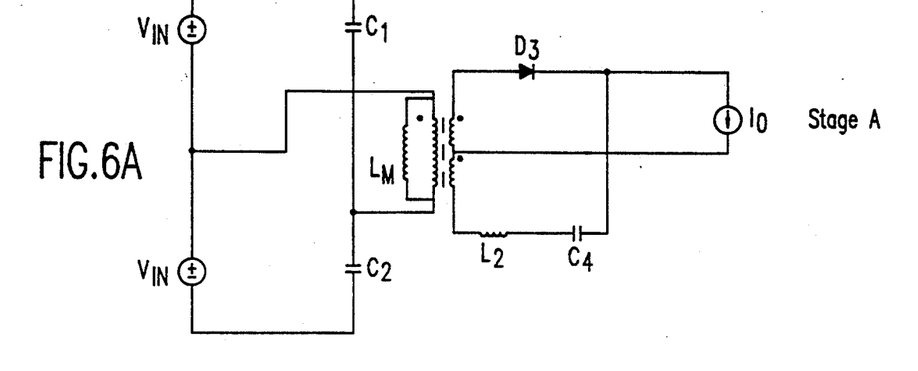

Stage A, FIG. 6A ($T_0$, $T_1$).

At t=$T_0$, Q1 is turned off. During this stage, capacitance C1 linearly charges, and C2 discharges at the same rate. Saturable inductor $S_{L2}$ remains saturated, and rectifier D4 continues to conduct. Saturable inductor $S_{L1}$ is blocking, and capacitance C3 resonates with inductor $L_1$. This stage ends when the voltage across C1 has charged up to half the supply voltage, and C2 has discharged to half the supply voltage.

Figure 6B:
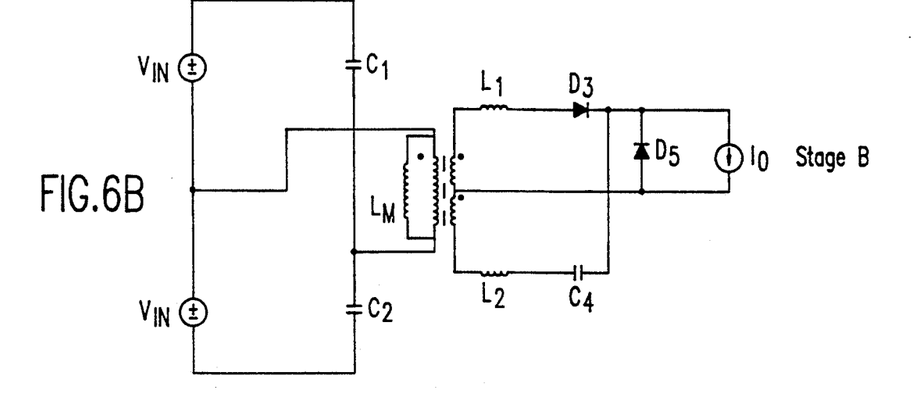

Stage B ($T_1$, $T_2$)

In stage B, capacitances C1 and C2 resonate with the magnetizing inductance of the power transformer. Capacitance C1 continues to charge, and capacitance C2 to discharge but now in resonant manner. Saturable inductor $S_{L2}$ is now blocking, and most of the load current flows through the freewheeling diode. Rectifier $D_3$ continues to conduct since the current through $L_1$ is greater than zero, and inductor $L_2$ and capacitor C4 continue to resonate. This stage ends when the voltage across capacitor C2 becomes zero (at the same time voltage across C1=$V_{in}$). Soon after the end of stage B, switch Q2 should be turned on in order to achieve zero-voltage-switching.

Figure 6C:
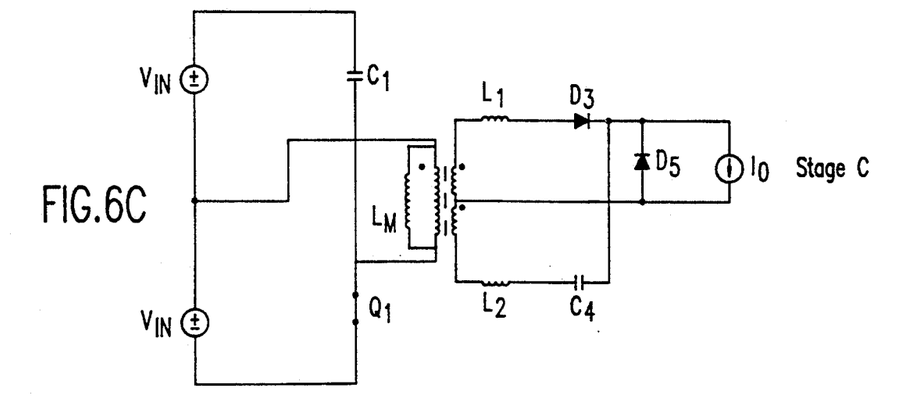

Stage C ($T_2$, $T_3$)

In this stage, inductor $L_1$ continues to linearly discharge, and inductor L2 and capacitor C4 continue to resonate since both saturable inductors are blocking. The freewheeling diode $D_5$ continues to conduct. This stage ends when the voltage across capacitor C4 resonates back up to zero, turning on rectifier D4.

Figure 6D:
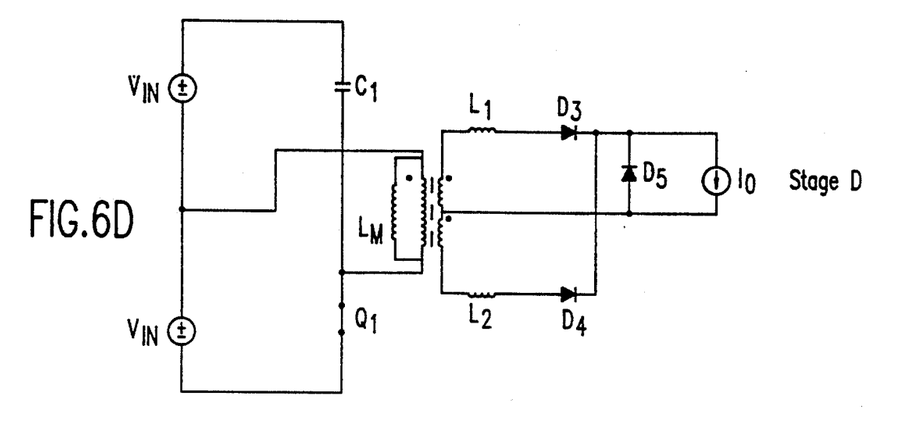

Stage D ($T_3$, $T_3$)

In stage D, the current through inductor $L_2$ increases linearly, the current through inductor $L_1$ continues to decrease linearly, and both saturable inductors are still blocking. The freewheeling diode continues to carry most of the load current. This stage ends when the current moving through inductor L2 decreases to zero turning rectifier D4 off.

Figure 6E:
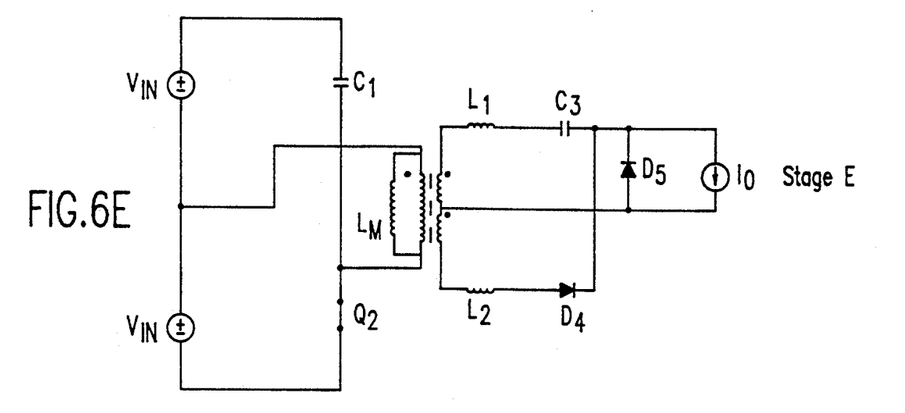

Stage E ($T_4$, $T_4$)

In this stage, capacitor C4 starts resonating with inductor $L_2$. The current through inductor $L_1$ continues to increase linearly. The freewheeling diode continues to conduct, and both saturable inductors are blocking. Stage E ends when $S_{L1}$ saturates, turning off the freewheeling diode.

Figure 6F:
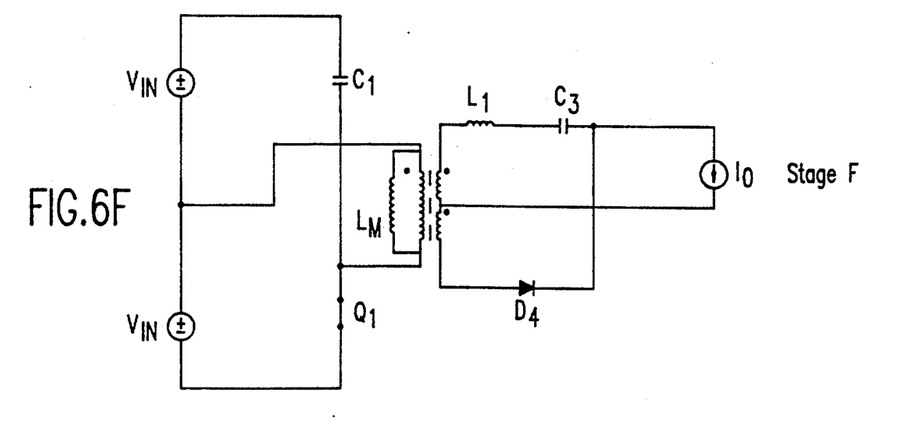
Figure 7A:
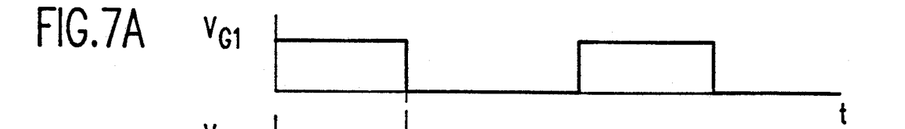
Figure 7B:
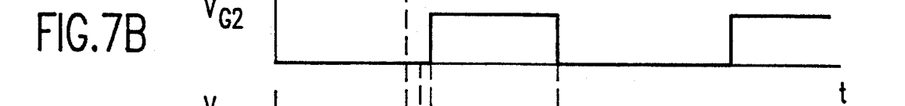
Figure 7C:
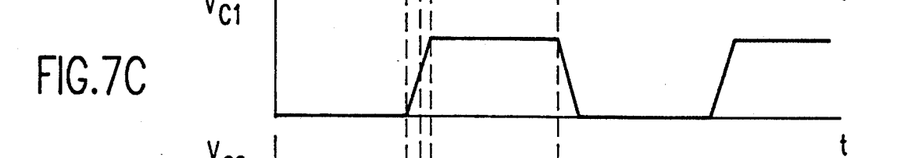
Figure 7D:
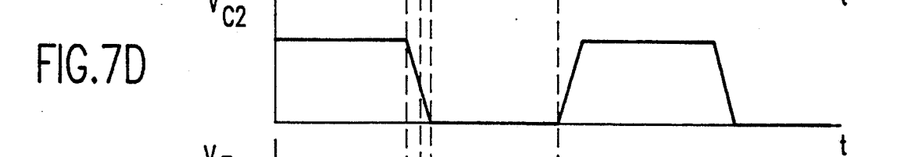
Figure 7E:
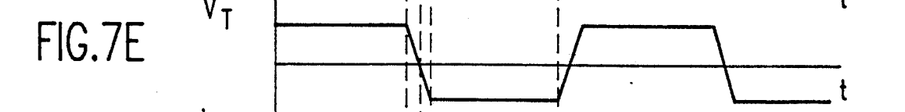
Figure 7F:
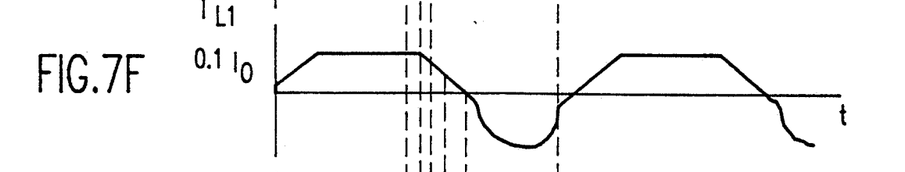
Figure 7G:
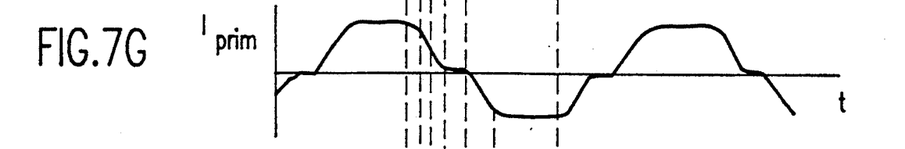
Figure 7H:
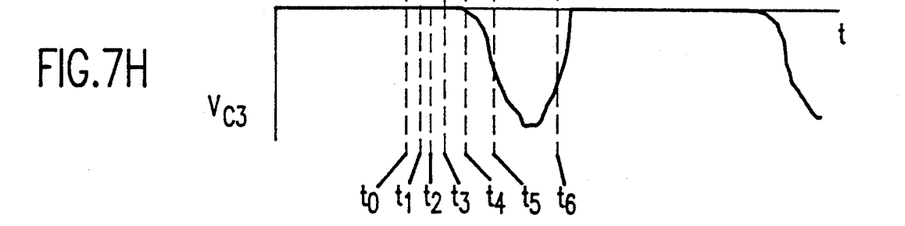

Stage F ($T_5$, $T_6$)

In stage F, $S_{L1}$ is saturated, most of the load current flows through $S_{L1}$, and the freewheeling diode ceases to conduct. The current thorough inductor $L_1$ remains constant as long as $S_{L1}$ is saturated and corresponds to less than 5–10% of the load current (depending on the design). Saturable inductor $S_{L2}$ is blocking, and capacitor C4 continues to resonate with L$_2$. This stage ends when switch Q2 is turned off, initiating a new conversion cycle. During no load operation, the converter follows a stage sequence similar to the one just described, except stage F will vanish to zero.

The primary switches in this converter turn on under zero voltage due to the resonance of the primary-switch capacitance and the magnetizing inductance. Similarly, the rectifiers turn on softly (zero-voltage turn-off) due to the controlled resonance of the rectifier capacitance and the linear inductors on the secondary side of the transformer. Since in normal operation the saturable inductors are not forced to sweep the complete B-H loop, the converter can operate at a relatively high frequency. A constant off-timer variable frequency control is required to regulate the output voltage. However, if controlled saturable inductors are used, the post regulation can be employed with a constant frequency of the primary switches.

In order to design an efficient converter, current stresses flowing through the converter must be minimized. The maximum current stress of the primary currents is determined by the size of the load, size of the magnetizing inductance of the power transformer, and the resonant components L$_1$, L$_2$ and C3, C4. A large magnetizing inductance would be desirable in order to reduce the ripple of the primary currents. Similarly, by selecting the smallest value of the resonant components C3 and C4 that will avoid multiple resonant cycles, and the largest possible value of L$_1$, L$_2$ (value limited by minimum switching frequency), minimizes the circulating energy flowing in the secondary circuit and between the secondary and primary circuits. In practice, the parallel combination of the linear and saturable inductor can be implemented by a simple magnetic element that is operated in both, its linear and saturated regions.

The presence of the leakage inductance may result in parasitic oscillations due to its interaction with the junction capacitance of the freewheeling diode. This oscillation can easily be damped by a snubber without much increased power loss, but a small leakage inductance will reduce these oscillations considerably. In order to obtain a small leakage inductance and large magnetizing inductance, the transformer must be designed to have tightly coupled windings; i.e. best possible transformer. The reset of the saturable inductors is predetermined by the operation of the converter. So, the number of turns in the saturable inductors must be selected as to minimize the power loss due to the swing resulting from the predetermined voltage swing and the conduction losses. The saturable inductor will carry 90-95% of the total output current.

A 100 W half-bridge zero-voltage-switching converter was designed for an input voltage range from 40 V to 60 V, an output voltage of 5 V, and a load-current range from 0 A to 20 A. The experimental power stage components are:

Q$_1$, Q$_2$ - IRF540 (International Rectifiers):
C$_1$, C$_2$ - output capacitance of IRF540;
TR - core: TDK EPC19 (material H$_{7C4}$); primary: 5×3 turns of 150/42 Litz wire; secondary 2 turn of 5 mil. copper foil; primary leakage inductance: 60 nH;
D$_3$, D$_4$ - 60CNQ045 (International Rectifier):
C$_3$, C$_4$ - 3×10 nF ceramic cap.;
SL$_1$/L$_1$, SL$_2$/L$_2$ - saturable inductor, core: Toshiba MB10 X6X4.5; winding: 4 turns 175/44 Litz wire;
L$_F$ - inductance: 1 μH; core: TDK RM6Z12 (material H$_{7C4}$) winding: 4 turns magnet wire AGW# 16: gap: 5 mm.;
C$_F$ - 5×3.3 μF NPO ceramic chip.

Figure 8:
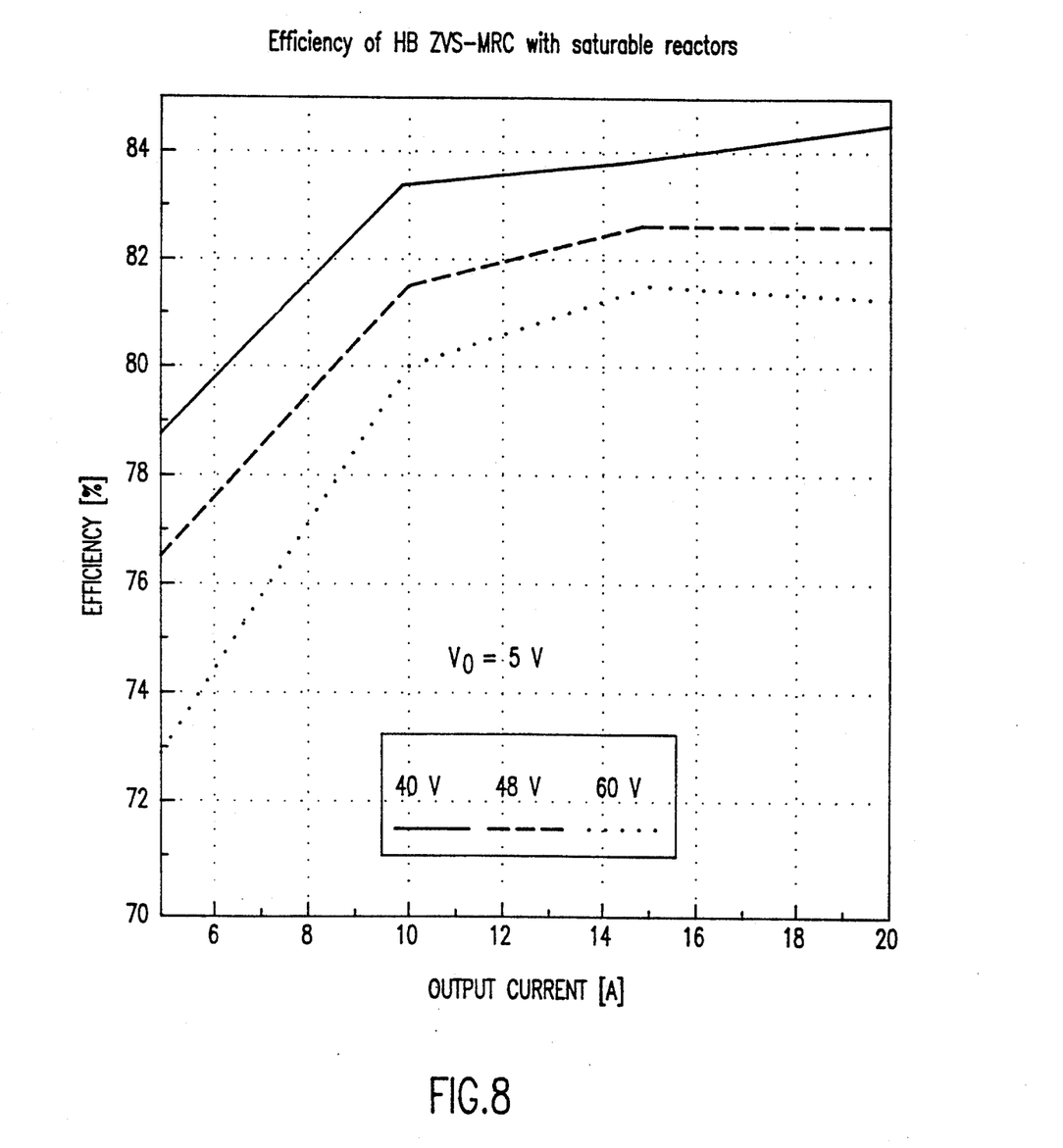
FIG. 8 is a graph showing the efficiency of a half-bridge zero-voltage-switching multi-resonant converter with saturable reactors in accordance with the teachings of this invention.
Figure 9:
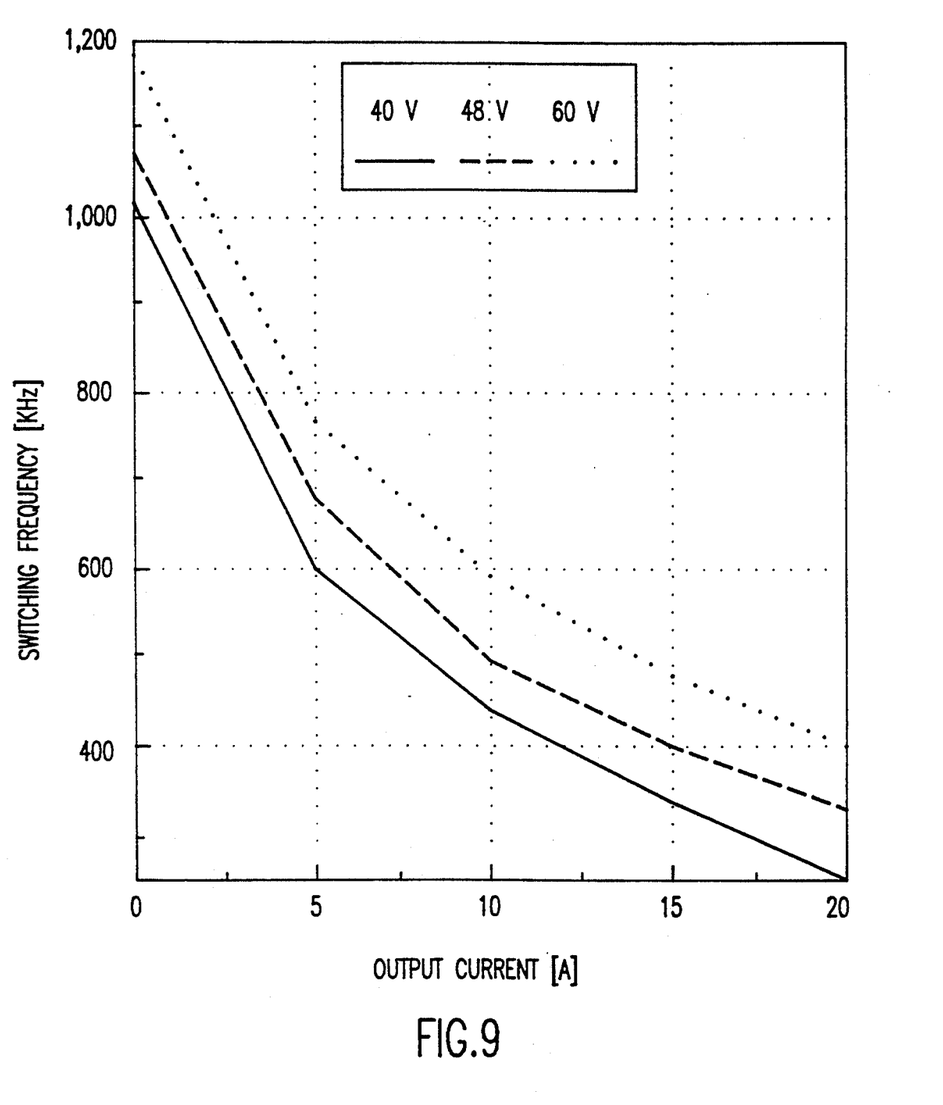
FIG. 9 is a graph showing the half-bridge switching frequency as a function of the load current for different input voltages.
Figure 10A:
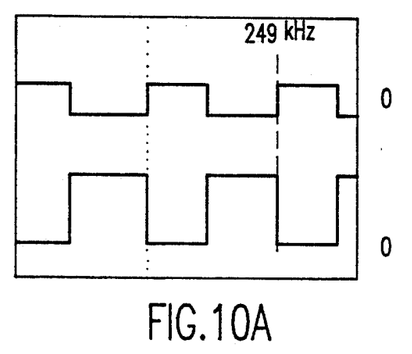
Figure 10B:
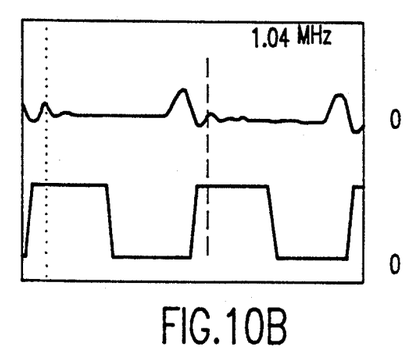
Figure 10C:
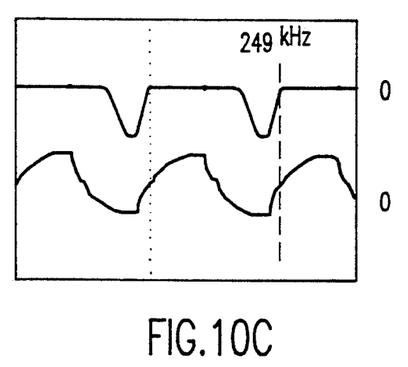
Figure 10D:
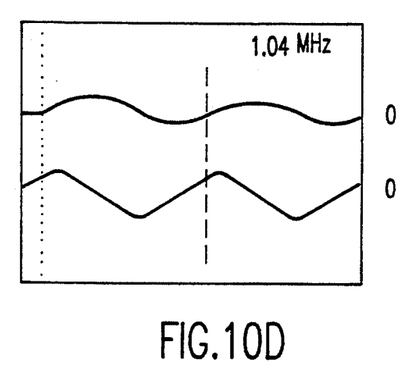

FIG. 8 shows the measured efficiency of the converter as a function of the load current for different input voltages. The converter has a maximum efficiency of 84.7% at low line and full load. The efficiency decreases to 81.8% at high line and full load. The switching frequency-range is from 250 kHz to 1 MHz. The complete switching frequency characteristic of this converter as a function of the load current is shown in FIG. 9. The efficiency fall-off with the input voltage is much slower than that of a similar zero-voltage-switching, multi-resonant-converter, since the circulating energy flowing through the converter has been minimized. Furthermore, this converter has a reduced frequency range (4 to 1) compared to a similar half-bridge zero-voltage-switching multi-resonant-converter. FIG. 10 shows typical oscillograms of key waveforms of the half-bridge converter for full-load (20 A) and no-load (0 A) operation.

It will be appreciated that the teachings of this invention can be applied to a new family of isolated zero-voltage-switching converters which utilizes the magnetizing inductance of the power transformer to achieve zero-voltage turn-on of the primary switches. By employing saturable inductors, the concept can be extended so that the rectifiers on the secondary side are turned on at zero-voltage with a minimum circulating energy moving through the converter.

Figure 11A:
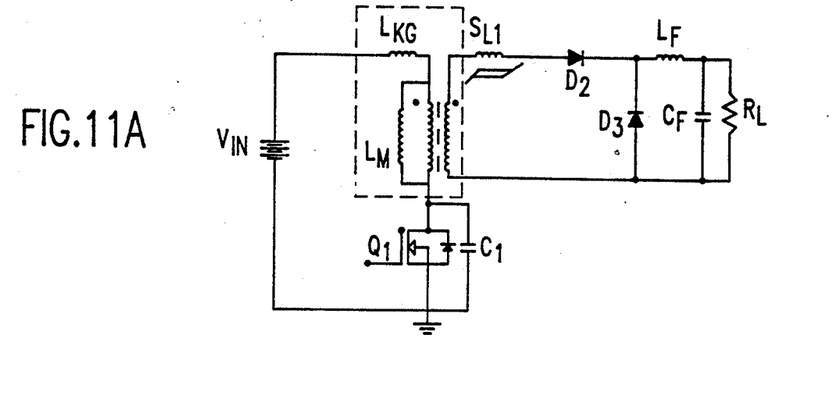
FIGS. 11A through 11C show the basic isolated topologies in accordance with this invention implemented using the series combination of the saturable reactor and rectifier diode.
Figure 11B:
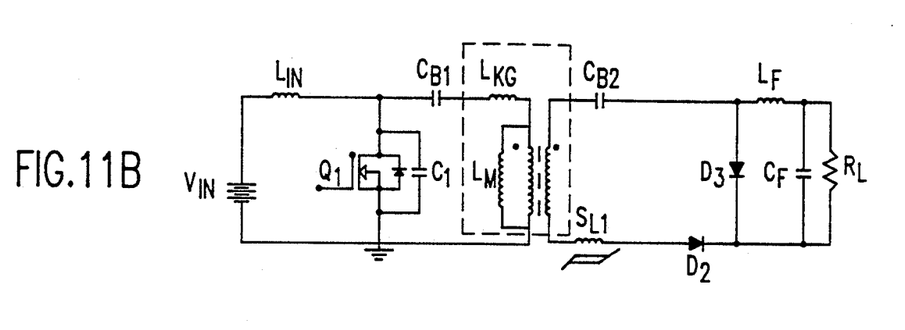
Figure 11C:
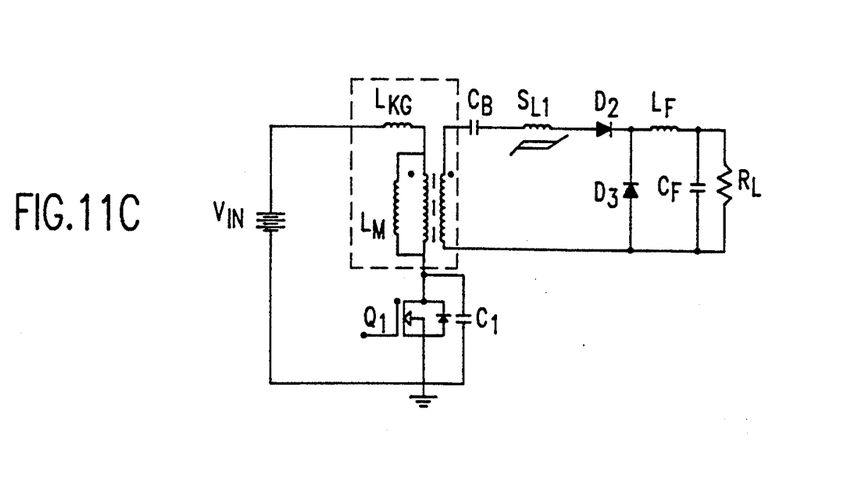
Figure 12A:
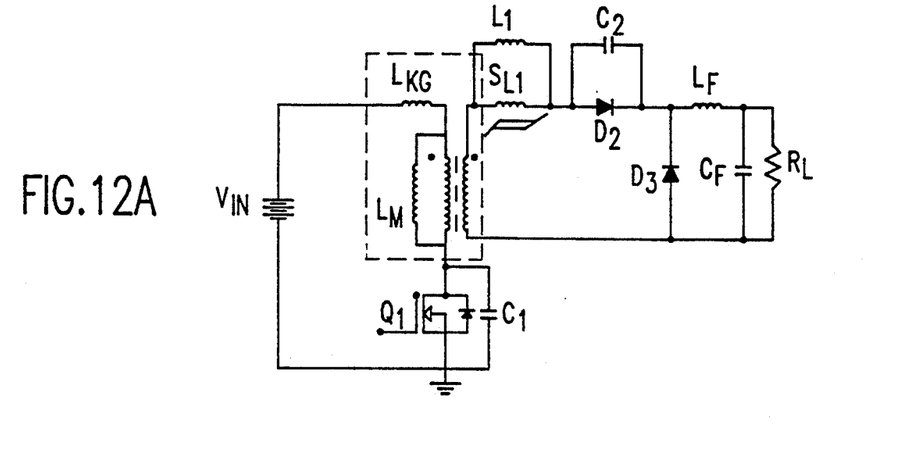
FIGS. 12A through 12E show basic isolated topologies for multi-resonant operation.
Figure 12B:
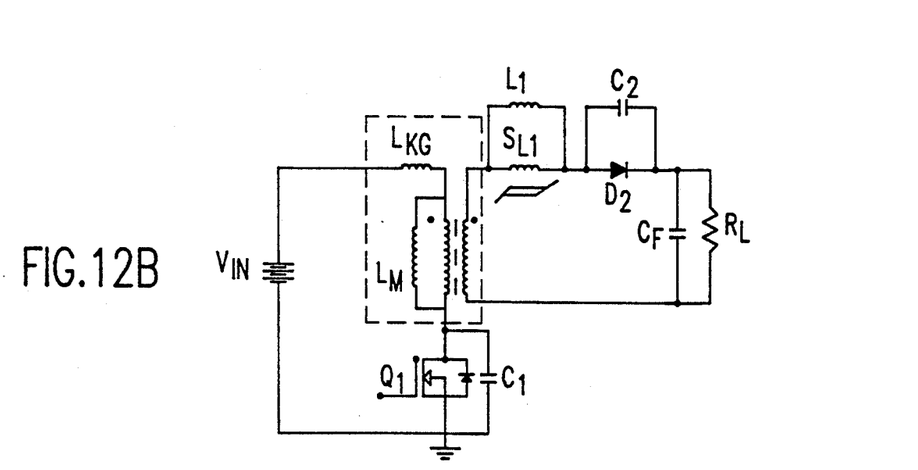
Figure 12C:
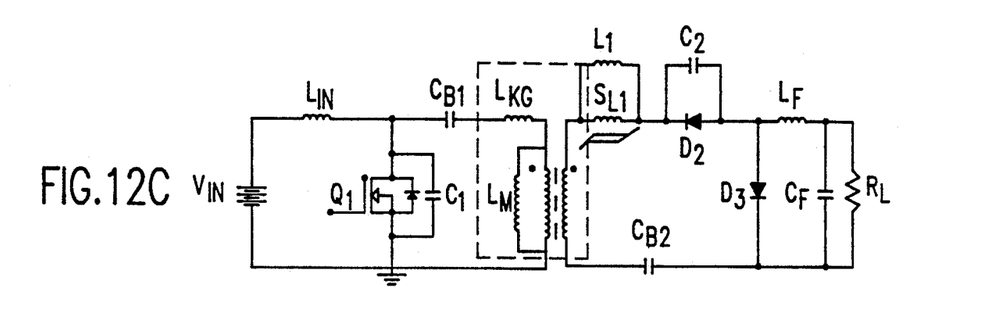
Figure 12D:
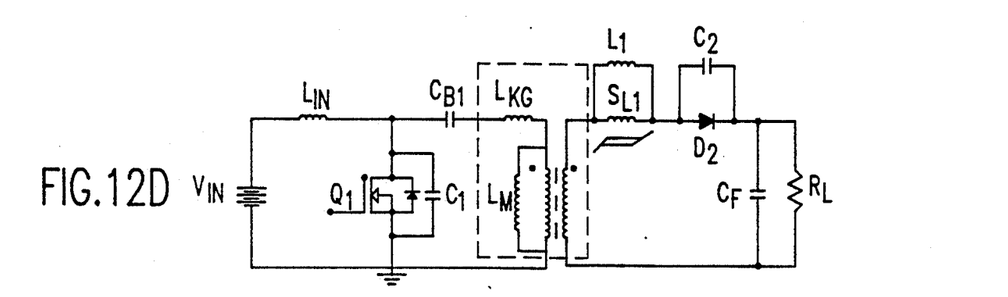
Figure 12E:
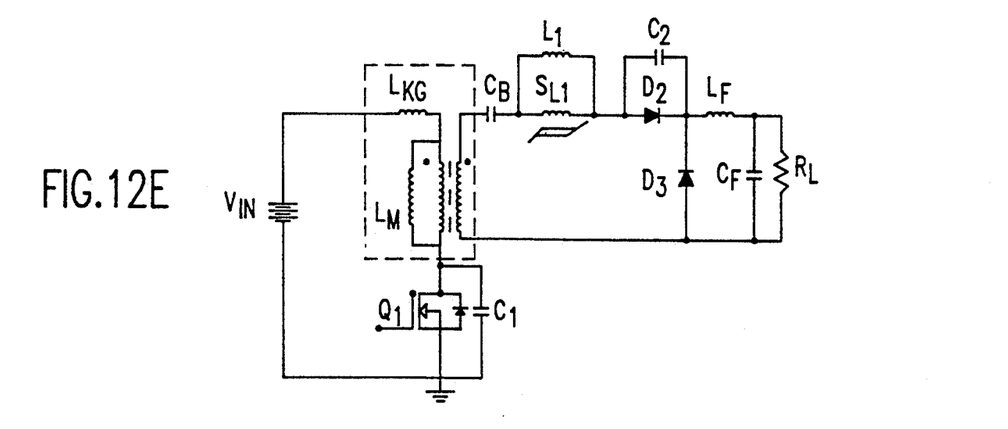

FIGS. 11A through 11C show the basic isolated topologies implemented using the series combination of the saturable reactor and rectifier diode: 11A illustrates a forward converter, lib a cuk converter and 11C a zeta converter. Similarly, FIGS. 12A through 12E show basic isolated topologies for multi-resonant operation: 12A illustrates a forward converter, 12B a flyback converter, 12C a cuk converter, 12D a septic converter and 12E a zeta converter.

Having thus described our invention, what we claim as new and desire to secure by Letters Patent is as follows:

1. An isolated, resonant, zero-voltage-switching converter, comprising in combination:
   a transformer having a primary winding and a secondary winding, said transformer having a magnetizing inductance;
   a direct current voltage source;
   primary switching means including a primary parasitic switch capacitance for periodically coupling said voltage source to said primary winding:
   a resonant circuit including said primary switch capacitance and said magnetizing inductance for establishing a zero voltage across said primary switching means immediately prior to turn-on of said primary switching means;
   a load impedance;
   means coupling said secondary winding of said transformer to said load impedance;
   said means coupling said secondary winding, including an LC filter, and a unidirectional switch that periodically blocks current flow in said secondary winding when a zero impedance condition exists across said primary winding.

2. An isolated, resonant, zero-voltage-switching converter as in claim 1, wherein said converter has a bridge-type topology and said means coupling said secondary winding of said transformer to said load impedance further includes a free-wheeling diode connected to the input of said LC filter to provide a path for filter inductor current when said switching means is in an off state.

3. An isolated, resonant, zero-voltage-switching converter as in claim 1, wherein said unidirectional switch comprises a saturable inductor and a rectifier diode connected in series.

4. An isolated, resonant, zero-voltage-switching converter as in claim 2, wherein said unidirectional switch comprises a saturable inductor and a rectifier diode connected in series.

5. An isolated, resonant, zero-voltage-switching converter as in claim 3, further including a linear inductor connected in parallel with said saturable inductor and a capacitance in parallel with said rectifier diode thereby providing zero voltage turn-off of said rectifier diode.

6. An isolated, resonant, zero-voltage-switching converter as in claim 4, further including a linear inductor connected in parallel with said saturable inductor and a capacitance in parallel with said rectifier diode thereby providing zero voltage turn-off of said rectifier diode.

* * * * *